United States Patent [19]
Hagiwara

[11] Patent Number: 5,190,131
[45] Date of Patent: Mar. 2, 1993

[54] FLUID COUPLING HAVING A PUMP SEAL

[75] Inventor: Mitsutoshi Hagiwara, Kariya, Japan

[73] Assignee: Aisin Seiki Kabushiki Kaisha, Kariya, Japan

[21] Appl. No.: 786,895

[22] Filed: Nov. 1, 1991

[30] Foreign Application Priority Data

Nov. 9, 1990 [JP] Japan .................... 2-117763[U]

[51] Int. Cl.$^5$ .......................................... F16D 35/00
[52] U.S. Cl. ................................ 192/58 B; 192/82 T
[58] Field of Search ..................... 192/58 B, 82 T

[56] References Cited

U.S. PATENT DOCUMENTS

| | | | |
|---|---|---|---|
| 4,190,139 | 2/1980 | Tinholt et al. | 192/58 B |
| 4,271,946 | 6/1981 | Bridge | 192/58 B |
| 4,564,093 | 1/1986 | Storz | 192/827 X |
| 4,592,456 | 6/1986 | Neugebauer | 192/58 B |
| 4,630,721 | 12/1986 | Johnston et al. | 192/827 X |
| 4,633,988 | 1/1987 | Light | 192/827 X |
| 4,741,421 | 5/1988 | Johnston | 192/58 B |
| 4,909,368 | 3/1990 | Hayashi | 192/58 B |
| 4,919,247 | 4/1990 | Takikawa et al. | 192/58 B |
| 4,974,712 | 12/1990 | Brown | 192/82 T X |
| 4,995,494 | 2/1991 | Kennedy et al. | 192/58 B |
| 5,113,987 | 5/1992 | Drennen et al. | 192/58 B |

Primary Examiner—Leslie A. Braun
Assistant Examiner—Nicholas Whitelaw
Attorney, Agent, or Firm—Oblon, Spivak, McClelland, Maier & Neustadt

[57] ABSTRACT

A fluid coupling includes an input shaft, a housing having a space therein and supported by the input shaft via a bearing, a dividing plate dividing the space into a storing chamber and an acting chamber through holes made in the dividing plate, a valve opening and closing the through holes, a rotor fixed to the input shaft and located in the acting chamber, pumping holes made in the dividing plate, pumping projections on the dividing plate at the downstream side of the pumping holes, and a seal located between the pumping holes and the pumping projections.

4 Claims, 2 Drawing Sheets

Rotating direction of rotor

FLUID COUPLING HAVING A PUMP SEAL

BACKGROUND OF THE INVENTION

Field of the Invention

The present invention relates to a fluid coupling and more particularly to a fluid coupling for connecting an engine to a fan in a motor vehicle.

Description of the Related Art

In general, viscous fluid is enclosed in a housing of a conventional fluid coupling. The housing is divided into a storing chamber and an acting chamber by a dividing plate which is fixed to the housing. A rotor which is fixed to a shaft and which is located in the acting chamber is driven by the shaft. If the fluid coupling is used for a coupling between an engine and a fan, an output shaft of the engine is connected with the shaft and the fan is fixed to the housing. The housing is rotatably supported to the shaft via a bearing. A rotating force of the shaft is transmitted to the housing via the rotor and viscous fluid in the acting chamber.

A supplying quantity of viscous fluid from the storing chamber to the acting chamber is controlled by a valve means which is located on the dividing plate. An opening ratio of the valve means is controlled by bimetal, for example. A transmitting capacity of the fluid coupling depends on the quantity of the viscous fluid in the acting chamber.

A pumping means comprises pumping holes which are made in the dividing plate and pumping projections which are made on the dividing plate at lower stream side of the pumping holes and which are located in the acting chamber. When the fluid coupling is activated, viscous fluid in the acting chamber is always recovered into the storing chamber by the pumping means. Namely, a stream of viscous fluid is generated by a revolution of the rotor, and the pumping projections dam up the stream of viscous fluid. Thus, viscous fluid which is under a high pressure by the pumping projections flows out of the storing chamber.

A pumping capacity of the pumping means also controls or affects the transmitting capacity of the fluid coupling. Namely, if the pumping capacity is small, a recovering time of viscous fluid from the acting chamber to the storing chamber is long. As a result, when the needed transmitting capacity of the fluid coupling changes from large capacity to the small capacity, an excessive transmitting capacity results, due to the poor pumping capacity of the pumping means.

SUMMARY OF THE INVENTION

Accordingly, it is a primary object of the present invention to improve a pumping capacity of a fluid coupling.

The above and other objects are achieved according to the present invention by a fluid coupling which comprises an input shaft, a housing having a space therein and supported to the input shaft via a bearing, a dividing plate dividing the space into a storing chamber and a acting chamber, through holes made in the dividing plate, a valve means for opening and closing the through holes, a rotor fixed to the input shaft and located in the acting chamber, pumping holes made in the dividing plate, pumping projections made on the dividing plate at the lower stream side of the pumping holes, and sealing means located between the pumping holes and the pumping projections.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE INVENTION

Figure 1:
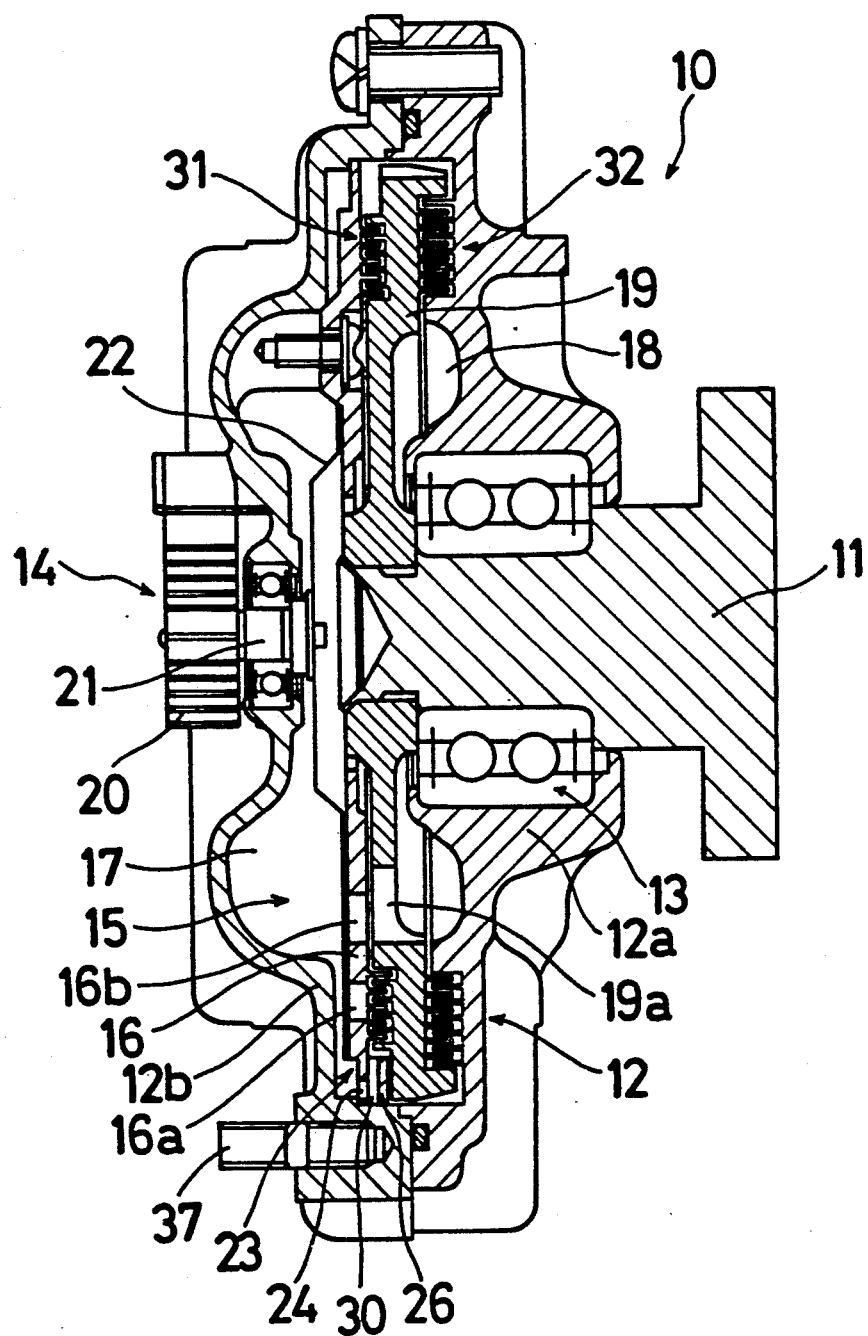
FIG. 1 is a cross-sectional view of a fluid coupling according to the invention.
Figure 2:
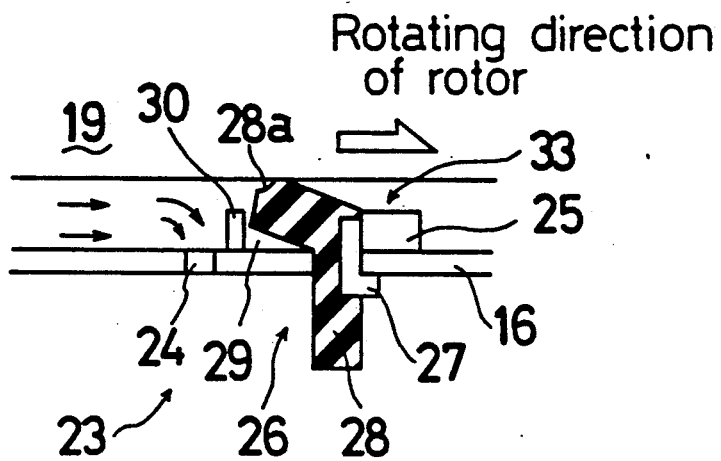
FIG. 2 is an enlarged cross-sectional view of FIG. 1.

Referring to FIGS. 1 and 2 wherein a fluid coupling 10 is shown, a housing 12 is rotatably supported to an input shaft 11 via a bearing 13. The input shaft 11 is connected with an output shaft (not shown) of an engine (not shown). The housing 12 comprises a body 12a and a cover 12b. A fan (not shown) is fixed to the housing 12 via a bolt 37. A radiator (not shown) for cooling the engine is located at a left side of the fluid coupling 10. Viscous fluid is enclosed in a space 15 of the housing 12. The space 15 is divided into a storing chamber 17 and a acting chamber 18 by a dividing plate 16.

Through holes 16a, 16b are made in the dividing plate 16 for connecting the storing room 17 and the acting room 18. A valve member 22 of a valve means 14 opens and closes the through holes 16a,16b in steps. The valve member 22 is driven by a bimetal 20 via a rod 21.

A rotor 19 is fixed to one end of the input shaft 11 and is located in the acting chamber 18. Through holes (only one is shown) 19a connect both sides of the rotor 19 and are connected with the through holes 16b. Torque-transmitting means 31,32 are formed on both sides of the rotor 19.

One or plural pumping means (only one is shown) 23 are located in the dividing plate 16 at the outer portion thereof. Following descriptions are with respect to one pumping means. Pumping hole 24 of the pumping means 23 is made in the dividing plate 16 and connects the storing chamber 17 and the acting chamber 18. Pumping projection 25 is made on the right side (in FIG. 1, a side located the acting chamber 18) of the dividing plate 16 at the downstream side of the pumping holes 24.

Sealing means 26 is located between the pumping hole 24 and the pumping projection 25. One end of an elastic member 28 is fixed to the dividing plate 16 with a fixing member 27 which is a rigid body. The other end of the elastic member 28 is in sliding engagement with the rotor 19 and has a depression 28a. A space 29 exists between the dividing plate 16 and one end of the elastic member 28. Further, a guide member 30 is located on the dividing plate 16 between the pumping hole 24 and the elastic member 28.

In the above-mentioned fluid coupling 10, when the engine is started, the input shaft 11, the rotor 19 and the housing 12 are driven. Immediately after the engine is started, the engine and the radiator are in a cold condition. Thus, the temperature of air which flows through the radiator, namely, the temperature detected by the bimetal 20 is low. At this time, the valve means 14 closes the through holes 16a,16b, and most of viscous fluid in the acting chamber 18 is recovered into the storing chamber 17 by the pumping means 23. Thus, the revolution number of the housing 12 (fan) is very low.

With the increasing of temperature detected by the bimetal 20, the valve means 14 opens the through holes 16a,16b in steps.

First, the through hole 16a is opened. At this time, viscous fluid in the storing chamber 17 is supplied to the torque-transmitting means 31 in the acting chamber 18 via the through hole 16a. The quantity of viscous fluid which flows into the through hole 16a is as same as or more than the quantity of viscous fluid which is recovered by the pumping means 23. So, the rotating force of the input shaft 11 is transmitted to the housing 12 via the rotor 19 and viscous fluid in the torque-transmitting means 31 at a medium speed.

Second, the through hole 16b is also opened in addition to the through hole 16a in opening condition. At this time, viscous fluid in the storing chamber 17 is supplied to the torque-transmitting means 31 via the through hole 16a and is supplied to the torque-transmitting means 32 via the through hole 16b. The quantity of viscous fluid which flows into the through hole 16a,16b is sufficiently more than the quantity of viscous fluid which is recovered by the pumping means 23. So, the rotating force of the input shaft 11 is transmitted to the housing 12 via the rotor 19 and viscous fluid in the torque-transmitting means 31,32 at a high speed.

In the acting chamber 18, viscous fluid has a circumferential stream according to the revolution of the rotor 19 and is gathered at an outer circumferential portion of the acting room 18 according to the centrifugal force. The pumping projections 25 and the sealing means 26 dam up the circumferential stream of viscous fluid. Thus, viscous fluid which is under a high pressure by the pumping projections 25 and the sealing means 26 flows out of the storing room 17 via the pumping hole 24.

The sealing means 26 prevents viscous fluid from flowing through a clearance 33 between the rotor 19 and the pumping projection 25. Therefore, the quantity of viscous fluid which flows out to the storing chamber 17 via the pumping hole 24 is sufficiently more than the quantity of viscous fluid of the conventional fluid coupling. Namely, the pumping capacity of the fluid coupling 10 is excellent.

Figure 3:
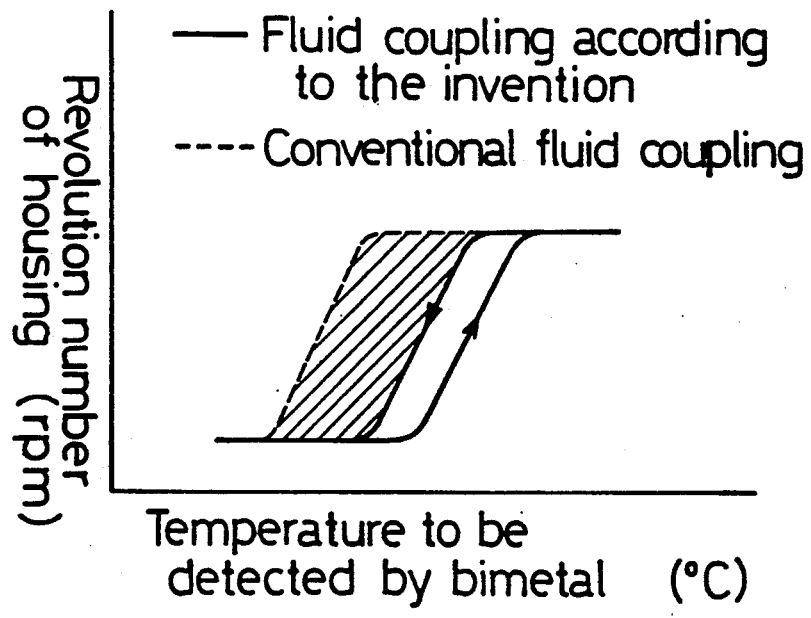
FIG. 3 is a characteristic chart for comparing a fluid coupling shown in FIG. 1 and a conventional fluid coupling.

As a result, as shown in FIG. 3, the width of the hysteresis curve of the fluid coupling 10 is narrower than the width of the hysteresis curve of the conventional fluid coupling.

Obviously, numerous modifications and variations of the present invention are possible in light of the above teachings. It is therefore to be understood that within the scope of the appended claims, the invention may be practiced otherwise than as specifically described herein.

What is claimed is:

1. A fluid coupling comprising:
    an input shaft;
    a housing having a space therein and supported by the input shaft via a bearing;
    a dividing plate dividing the space into a storing chamber and an acting chamber;
    through holes made in the dividing plate;
    a valve means for opening and closing the through holes;
    a rotor fixed to the input shaft and located in the acting chamber;
    pumping holes made in the dividing plate;
    pumping projections made on the dividing plate at a downstream side of the pumping holes and corresponding thereto; and
    sealing means located between each of the pumping holes and each of the pumping projections for sealing a space between said dividing plate and said rotor, wherein the sealing means comprises an elastic member having one end fixed to the dividing plate and the other end in sliding contact with the rotor.

2. A fluid coupling as set forth in claim 1, wherein the other end of the elastic member has a depression.

3. A fluid coupling as set forth in claim 1, further comprising a guide member located on the dividing plate so as to be between the pumping hole and the elastic member.

4. A fluid coupling as set forth in claim 1, further comprising a space existing between the dividing plate and the one end of the elastic member.

* * * * *